(12) United States Patent
Charriere et al.

(10) Patent No.: US 6,956,870 B1
(45) Date of Patent: Oct. 18, 2005

(54) DATA PACKET LENGTH INDICATION FOR MOBILE TELECOMMUNICATIONS SYSTEMS

(75) Inventors: Patrick Charriere, Tetbury (GB); David Lahiri Bhatoolaul, Grange Park (GB); Qiang Cao, Abbey Meads (GB); Seau Sian Lim, Swindon (GB)

(73) Assignee: Lucent Technologies Inc., Murray Hill, NJ (US)

( * ) Notice: Subject to any disclaimer, the term of this patent is extended or adjusted under 35 U.S.C. 154(b) by 785 days.

(21) Appl. No.: 09/713,129

(22) Filed: Nov. 15, 2000

(30) Foreign Application Priority Data

Nov. 23, 1999 (GB) ................................. 99309327

(51) Int. Cl.[7] ............................................... H04J 3/16
(52) U.S. Cl. ..................................... 370/470; 370/474
(58) Field of Search ................................ 370/464, 468, 370/470, 471, 472, 473, 474, 45, 395.1, 393; 370/422, 423, 395.2; 711/212, 214, 220; 714/746; 455/414, 449, 411

(56) References Cited

U.S. PATENT DOCUMENTS

| | | | | |
|---|---|---|---|---|
| 4,516,203 A | * | 5/1985 | Farber et al. ................ 711/3 |
| 5,805,594 A | * | 9/1998 | Kotchey et al. ............. 370/401 |
| 5,805,818 A | * | 9/1998 | Perlman et al. .............. 709/224 |
| 6,094,525 A | * | 7/2000 | Perlman et al. .............. 709/245 |
| 6,301,479 B1 | * | 10/2001 | Roobol et al. ............... 455/436 |
| 6,330,614 B1 | * | 12/2001 | Aggarwal et al. ........... 709/236 |
| 6,370,391 B1 | * | 4/2002 | Lietsalmi et al. ............ 455/466 |
| 6,498,667 B1 | * | 12/2002 | Masucci et al. ............... 398/98 |
| 6,502,155 B1 | * | 12/2002 | Kondo et al. ................ 710/305 |
| 6,631,116 B1 | * | 10/2003 | Eneroth et al. ............ 370/236.2 |
| 6,675,222 B1 | * | 1/2004 | Peterson et al. ............. 709/232 |
| 2001/0015985 A1 | * | 8/2001 | Van Grinsven et al. ..... 370/471 |
| 2002/0048281 A1 | * | 4/2002 | Yi et al. ...................... 370/474 |

FOREIGN PATENT DOCUMENTS

| | | | |
|---|---|---|---|
| EP | 0 786 919 A1 | 7/1997 | .......... H04Q 11/04 |
| WO | WO 98/26567 | 6/1998 | .......... H04M 11/00 |
| WO | WO 99/33230 | 7/1999 | ........... H04L 12/56 |

* cited by examiner

*Primary Examiner*—Bob Phunkulh
*Assistant Examiner*—Ian N. Moore

(57) ABSTRACT

In a data packet, e.g. a PDU of the UMTS, a length indicator field of variable granularity is created, depending on the exact length of the payload to be transmitted. An additional field is provided, a single bit in length, to indicate the granularity of the length indicator field. This increases the resolution of the header, whilst keeping low an overhead of extra field bits. The method comprises: assessing the length of the data to determine the appropriate units, from a plurality of possible units, in which the length should be expressed; setting the granularity field to define the appropriate units in which the length of the data is to be indicated; and setting the length indicator field to indicate the data length.

6 Claims, 4 Drawing Sheets

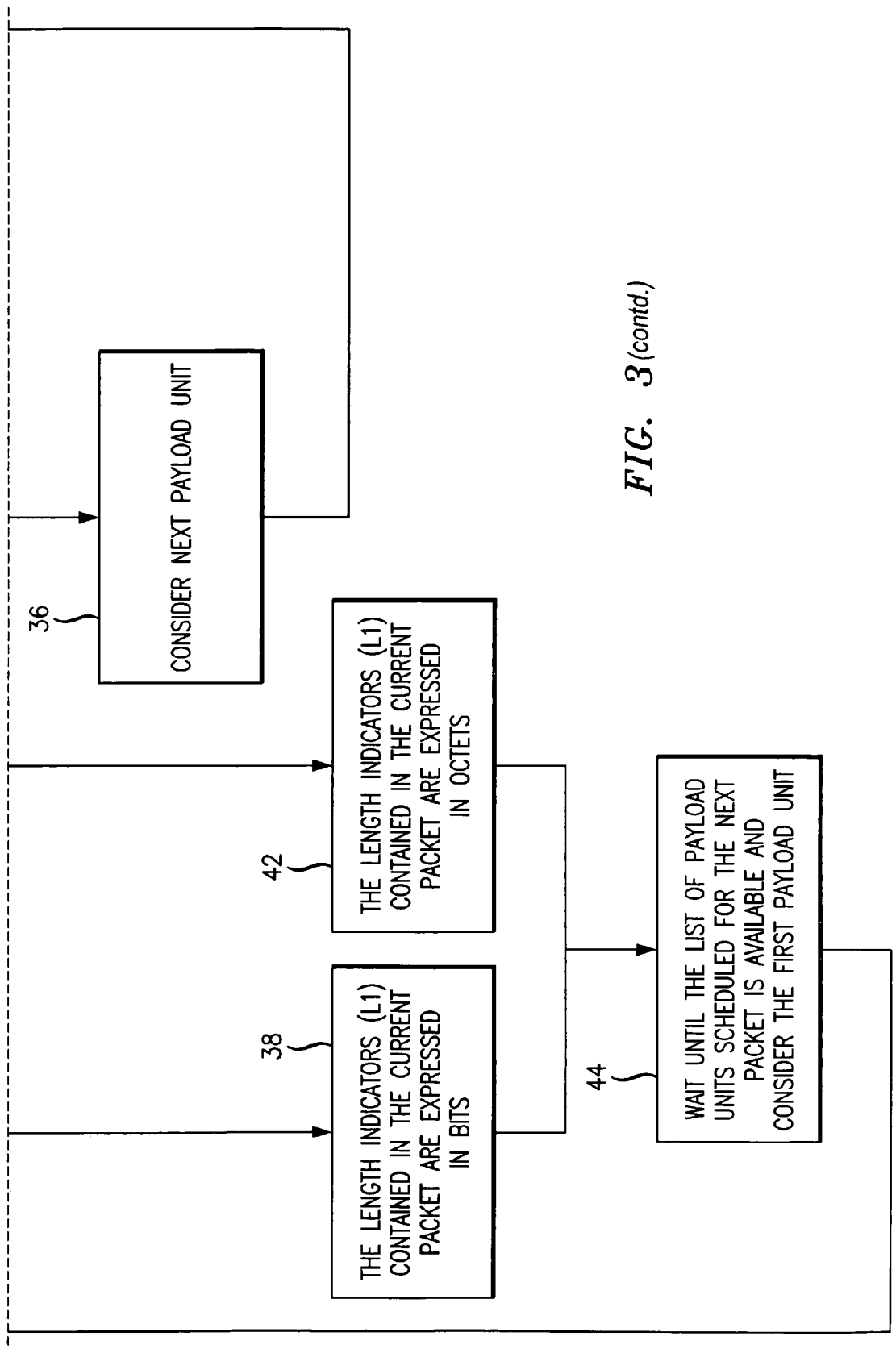
FIG. 3 (contd.)

DATA PACKET LENGTH INDICATION FOR MOBILE TELECOMMUNICATIONS SYSTEMS

BACKGROUND OF THE INVENTION

1. Field of the Invention

The present invention relates to mobile telecommunications systems, particularly though not exclusively the Universal Mobile Telecommunications System (UMTS).

2. Description of the Related Art

In systems such as UMTS and GSM, data is transmitted over the air interface as packets, and the length of the payload transported by a packet is indicated by the Length Indicator (LI) field contained in its header. In systems such as GSM, the LI values are defined in octets. In the UMTS system, the packets have a strictly defined structure and are known as Data Units, e.g. Protocol Data Units (PDU). Their format is defined in the 3GPP™ RLC Protocol Specification 3G TS 35.322, Section 9.2—Elements for Peer-to-Peer Communication—Formats and Parameters. Generally these Data Units have a header and one or more following payload units of data. Many of these Data Units have length indicator (LI) fields, e.g. UMD PDU and AMD PDU (unacknowledged/acknowledged mode data PDU). In UMTS, the length indicator (LI) gives the number of octets of the length of a data segment. The size of the length indicator may be either 7 or 15 bits. If more than one payload unit (PU) is transported in the packet additional length indicators can be used to indicate the limit between the different PU's. The length Indicator Field is also used to indicate the start of the padding area at the end of a packet.

With UMTS, some applications (e.g. Adaptive Multi Rate speech codecs) produce frames whose length is not a multiple value of 8 bits. Therefore, with such frames, there is no way to indicate to the peer-receiving end the exact length of the payload.

SUMMARY OF THE INVENTION

The present invention adapts the length indicator field so that it can indicate the precise length of a payload unit, even where the length is not a multiple value of 8 bits. Whilst it would in principle be possible to have the length indicator field increased in granularity to indicate the payload in number of bits, this would result in a need for a longer LI field (3 more bits needed). On the other hand, many applications do not require a decrease in LI granularity, since the data is always defined in octets. Thus in the general case decreasing the LI granularity leads to a waste of bandwidth.

Thus, the present invention creates, for a payload of a packet, a length indicator field of variable granularity, depending on the exact length of the payload to be transmitted. An additional field is provided, which may just be a single bit in length, to indicate the granularity of the length indicator field.

Thus a first embodiment of the present invention provides, in a mobile telecommunications system, a method of indicating the length of a data payload to be transported in a packet, the method comprising:
 a. assessing the length of a data section to determine the appropriate units, from a plurality of possible units, in which the length should be expressed;
 b. setting a granularity field to define said appropriate units in which the length of the data is to be indicated in a data length indicator field; and
 c. setting the length indicator field to indicate the data length.

In a second embodiment, the present invention provides, in a mobile telecommunications system, apparatus for providing an indication of the length of a data payload to be transported in a packet, the apparatus comprising:
 a. means for assessing said length of data to determine appropriate units, from a plurality of possible units, in which the length should be expressed;
 b. means for setting a granularity field to define said appropriate units in which the length of the data is to be indicated in a data length indicator field; and
 c. means for setting the length indicator field to indicate the data length.

In a third embodiment, the presents aspect, the present invention provides in a mobile telecommunications system, an indicator of the length of data to be transported in a packet, wherein the packet comprises:
 a granularity field in the packet header which defines the units in which the length of the data is to be indicated; and
 a length indicator field indicating the packet data length in the units defined by the granularity field.

As preferred the granularity field may be a single bit to indicate whether the length indicator field is expressed in bits or octets. However the granularity field may be more than one bit to indicate other units, for example kilo-octets; in principle any units may be used, e.g. hexadecimal.

Thus, the solution is to create in the packet header an indicator for the LI granularity of the field. For instance one bit can be used to indicate if the LI fields are in octets or in bits. This bit is dynamically changed, preferably on a packet per packet basis. Since the LI field granularity is managed on a packet by packet basis, it optimizes the transmission bandwidth and meets whenever needed the requirements to transmit PDU's with non-multiple of 8 bits payload sizes.

BRIEF DESCRIPTION OF THE DRAWINGS

A preferred embodiment of the invention will now be described with reference to the accompanying drawings, wherein.

DESCRIPTION OF THE PREFERRED EMBODIMENT

Figure 1:
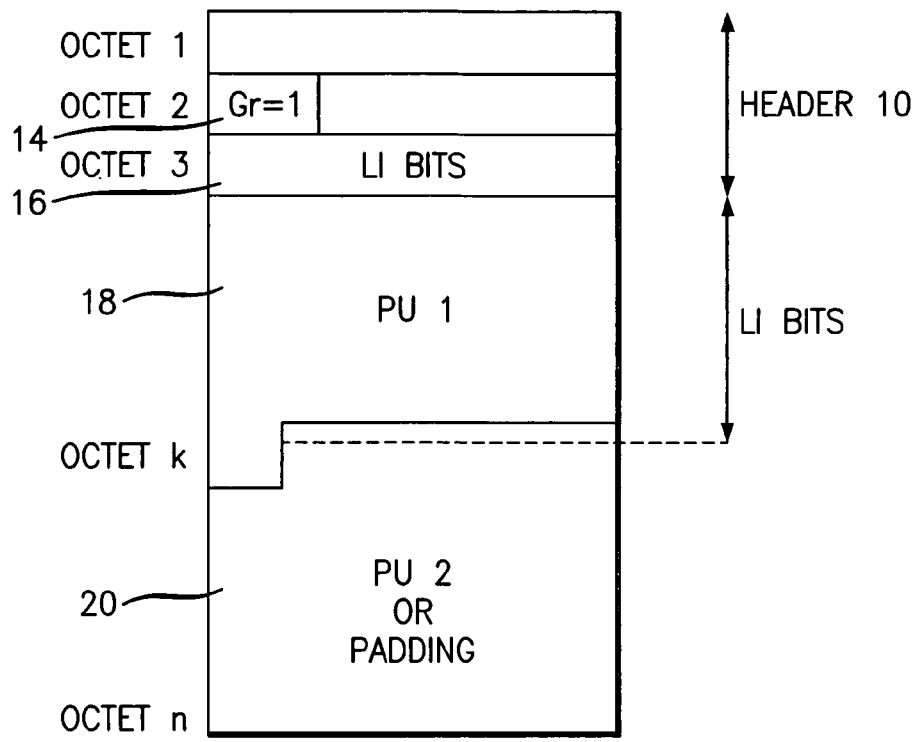
FIGS. 1 and 2 are schematic diagrams of protocol data units (PDU) for the UMTS incorporating the of the present invention.
Figure 2:
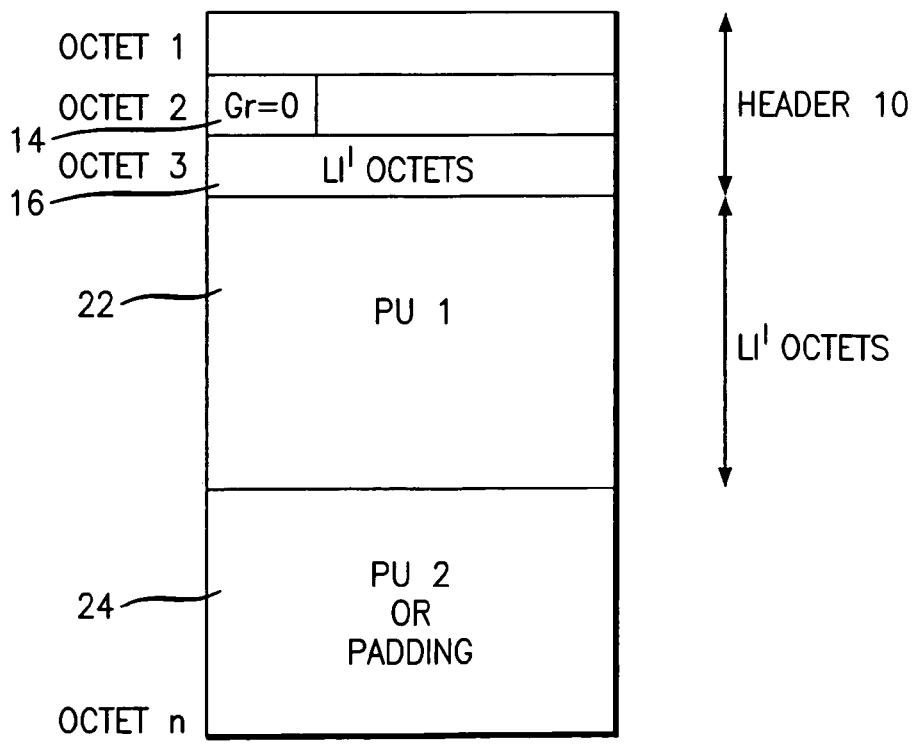

Referring now to FIGS. 1 and 2, there is shown two UMTS PDU of similar type, for example AMD PDU. The PDU of FIG. 1 has a header 10. The header 10 comprises various fields formed in Octets of bits, with Octet 2 having a first bit reserved as a Granularity Indicator 14, for the next subsequent field in Octet 3, a Length Indicator 16. Length Indicator 16 indicates the length of the data octets, or payload, 18 attached to the header. In addition a further padding 20 of (k–n) octets is provided. In this example payload 18 is not an even number of octets, but has some remainder bits. Accordingly the Granularity Indicator 14 is set to Gr=1, and the Length Indicator 16 is expressed as a number of bits L1. This may require Indicator 16 being more than one octet.

In FIG. 2, similar parts are indicated by the same reference numerals. A payload 22 has an even number of octets, L1'. In addition a padding 24 has an even number of octets. In this example the Granularity Indicator 14 is set to Gr=0, and the Length Indicator 16 is expressed as a number of octets L1'.

Figure 3:
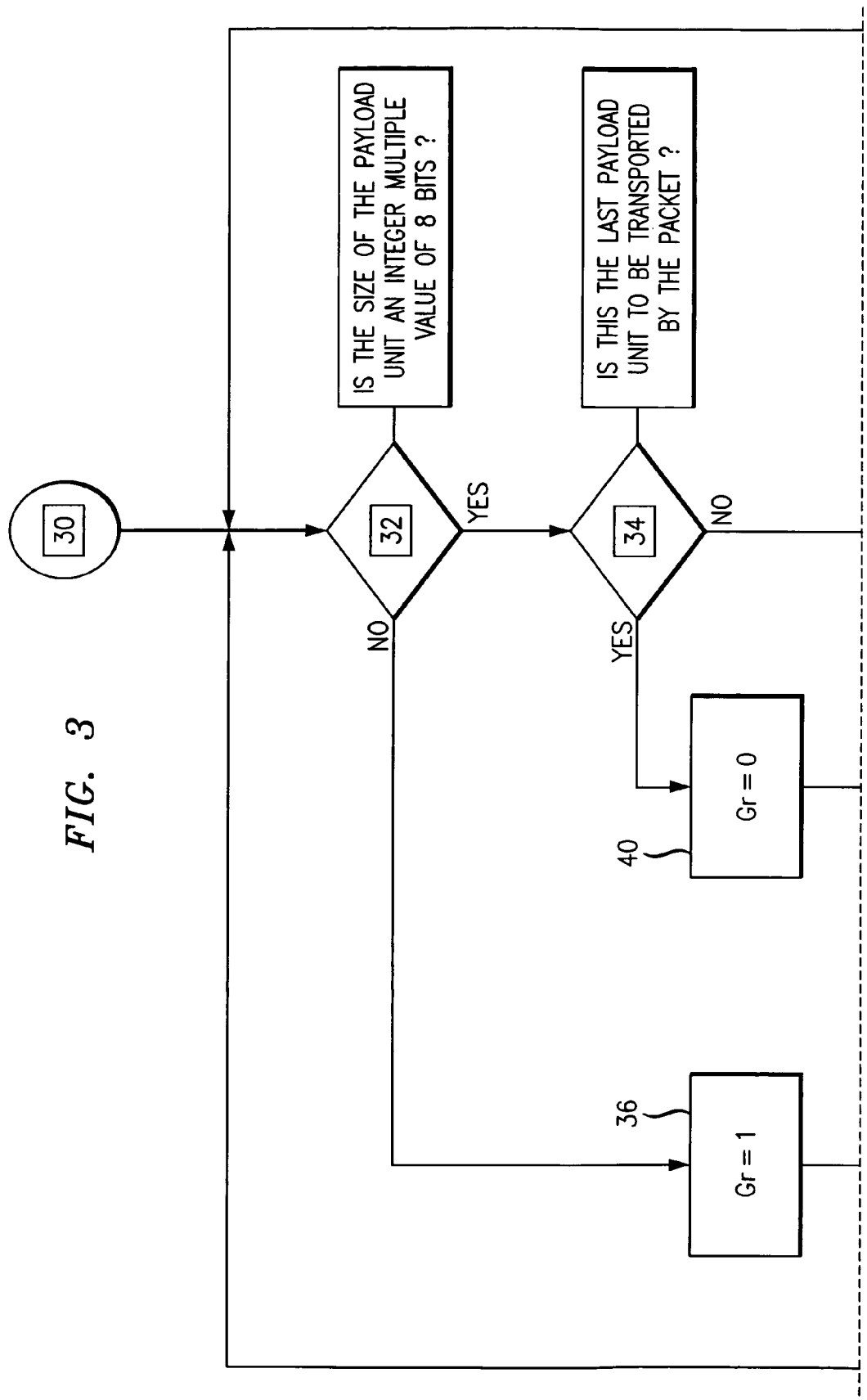
FIG. 3 is a flow chart showing the method of the present invention for inserting a granularity field into a PDU.

Referring to FIG. 3, the method of the invention is carried out as follows. From a start point 30, which is initiated when PDU are to be transported, each consecutive PDU is assessed at 32 to determine whether the size of the first payload unit is an integral multiple value of 8 bits. Since some PDU may contain more than one payload, an assessment is made at 34 whether this is the last payload unit. If not, the next payload unit is considered at 36.

If at 32 the payload is not an integral multiple value of 8 bits, the Granularity Indicator is set at 36 Gr=1, and at 38 the Length Indicator is expressed as a number of bits. If at 32 the payload is an integral multiple value of 8 bits, and the payload is the last payload unit, the Granularity Indicator is set at 40 Gr=0, and a 42 the Length Indicator is expressed as a number of octets. Thus in order for Gr=0, all the payload units in the packet must be octets. However for Gr=1, only one payload unit need be not an integral multiple value of 8 bits. Finally, at 44, the method is paused to await information of the next PDU to be transported.

Figure 4:
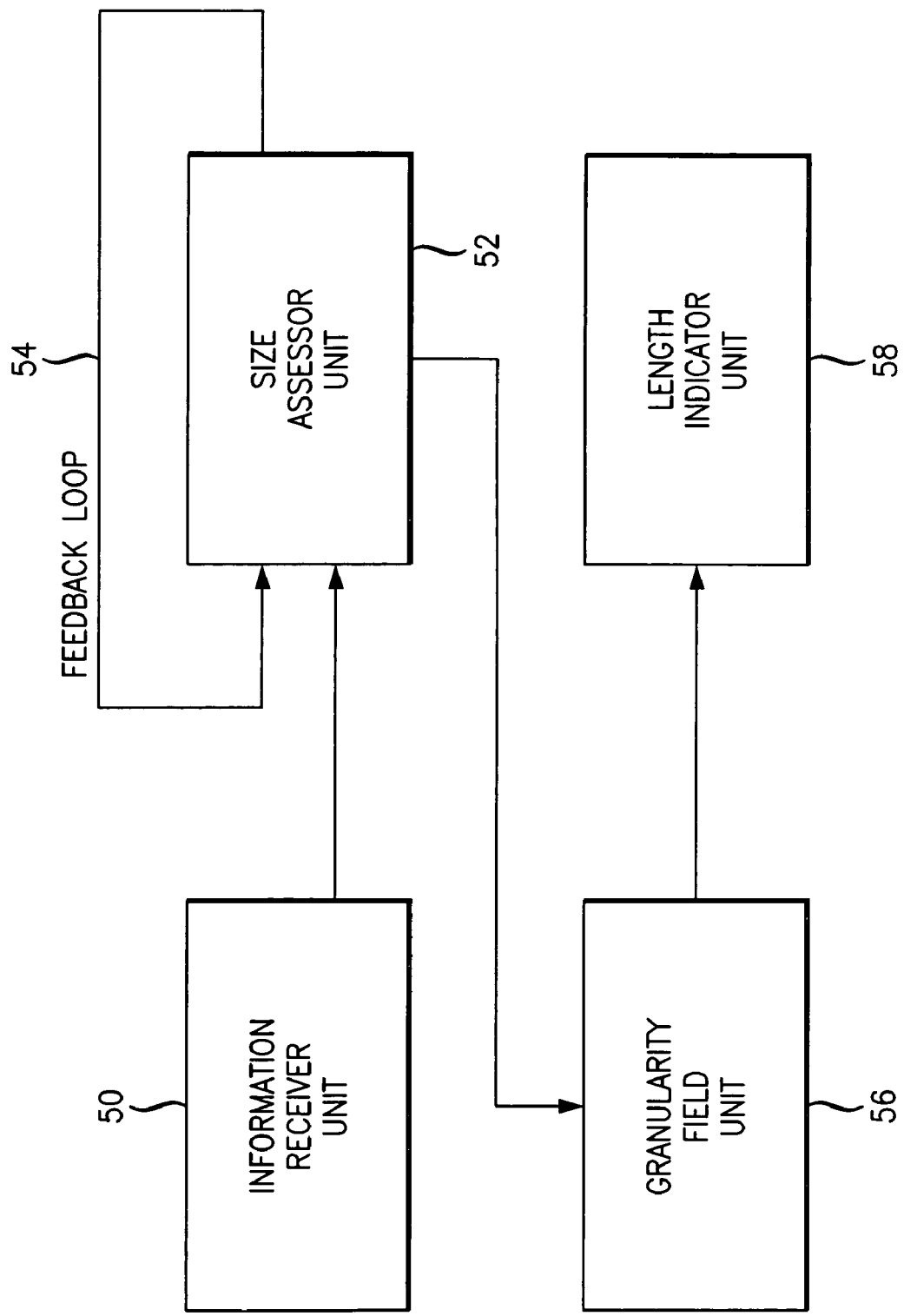
FIG. 4 is a schematic block diagram of apparatus for carrying out the method of FIG. 3.

Referring now to FIG. 4, this shows apparatus for carrying out the method of FIG. 3, comprising an information receiver unit 50 for receiving information as to the next available packet. When available, this information is passes to a size assessor unit 52, which determines whether each payload unit of the packet is or is not an integral multiple value of 8 bits. A feedback loop 54 indicates that each payload unit is considered in sequence. Assessor unit 52 is coupled to a Granularity field unit 56 for setting the Granularity Indicator, and this is in turn coupled to a Length Indicator Unit 58 for indicating the length of the payload.

What is claimed is:

1. In a mobile telecommunications system, a method of indicating length of a data payload to be transported in a packet, the method comprising:
   a. assessing the length of a data section to determine appropriate units, from a plurality of possible units, in which the length should be expressed;
   b. setting a granularity field to define said appropriate units in which the length of the data section is to be indicated in a data length indicator field; and
   c. setting the length indicator field to indicate the data length;
   wherein the packet is assessed to determine whether it contains more than one payload unit, and each payload unit is assessed to determine said appropriate units;
   wherein the granularity field is set according to the units of the payload unit which is to be expressed in the smallest units, unless the payload units can be expressed in larger units of the possible units whereupon the granularity field is set according to such larger units.

2. A method according to claim 1, wherein the appropriate units are determined to be the largest units in which the length can precisely be expressed.

3. A method according to claim 1, wherein the units are bits and octets, and the granularity field is one bit in length to indicate length in bits or octets.

4. A method according to claim 1, wherein the granularity field is located in the packet header adjacent the length indicator field.

5. In a mobile telecommunications system, apparatus for providing an indication of length of a data payload to be transported in a packet, the apparatus comprising:
   a. means for assessing said length of data to determine appropriate units, from a plurality of possible units, in which the length should be expressed;
   b. means for setting a granularity field to define said appropriate units in which said length of data is to be indicated in a data length indicator field; and
   c. means for setting the length indicator field to indicate the data length;
   wherein the assessing means is operative to determine whether the packet contains more than one payload unit, and for assessing each such payload unit to determine said appropriate units;
   wherein the apparatus is operative to select the appropriate units according to the units of the payload unit which is to be expressed in the smallest units, unless the payload units can be expressed in larger units of the possible units whereupon the granularity field is set according to such larger units.

6. Apparatus according to claim 5, wherein the assessing means is arranged to determine the appropriate units as the largest units in which the length can precisely be expressed.

* * * * *